US010227937B2

(12) United States Patent
Bhattacharya et al.

(10) Patent No.: US 10,227,937 B2
(45) Date of Patent: Mar. 12, 2019

(54) METHODS AND SYSTEM FOR A TURBOCHARGER

(71) Applicant: General Electric Company, Schenectady, NY (US)

(72) Inventors: Aninda Bhattacharya, Bangalore (IN); Bret Dwayne Worden, Erie, PA (US); Ajay Kumar Behera, Bangalore (IN); Mahesh Panicker, Bangalore (IN); Wrichik Basu, Bangalore (IN); Matthew John Malone, Boulder, CO (US); Arwa Hatim Ginwala, Pune (IN)

(73) Assignee: GE Global Sourcing LLC, Norwalk, CT (US)

( * ) Notice: Subject to any disclaimer, the term of this patent is extended or adjusted under 35 U.S.C. 154(b) by 549 days.

(21) Appl. No.: 14/931,906

(22) Filed: Nov. 4, 2015

(65) Prior Publication Data

US 2017/0122230 A1    May 4, 2017

(51) Int. Cl.
| | | |
|---|---|---|
| F02D 23/00 | (2006.01) | |
| F02D 41/00 | (2006.01) | |
| F02D 41/22 | (2006.01) | |
| F02B 39/16 | (2006.01) | |
| F02D 17/04 | (2006.01) | |
| F02D 41/28 | (2006.01) | |

(52) U.S. Cl.
CPC .......... F02D 41/0007 (2013.01); F02B 39/16 (2013.01); F02D 41/221 (2013.01); *F02D 17/04* (2013.01); *F02D 2041/288* (2013.01)

(58) Field of Classification Search
CPC ..... F02D 41/0007; F02D 41/221; F02B 39/16
USPC .................................. 60/602; 701/101, 102
See application file for complete search history.

(56) References Cited

U.S. PATENT DOCUMENTS

| | | |
|---|---|---|
| 4,027,531 A | 6/1977 | Dawson |
| 4,473,950 A | 10/1984 | Finn et al. |
| 4,700,117 A | 10/1987 | Giebeler et al. |
| 5,130,589 A | 7/1992 | Kanemitsu |
| 6,338,250 B1 | 1/2002 | Mackay |
| 7,188,497 B2 | 3/2007 | Mella et al. |
| 7,387,008 B2 | 6/2008 | Heffron et al. |
| 7,640,794 B2 | 1/2010 | Farmer |

(Continued)

FOREIGN PATENT DOCUMENTS

| | | |
|---|---|---|
| CN | 201181194 Y | 1/2009 |
| KR | 100956263 B1 | 5/2010 |

(Continued)

OTHER PUBLICATIONS

Fengshou Gu, et al.; An investigation of the Elects of Measurement Noise in the Use of Instantaneous Angular Speed for Machine Diagnosis; Mechanical Systems and Signal Processing; 2006.

(Continued)

*Primary Examiner* — Ngoc T Nguyen
(74) *Attorney, Agent, or Firm* — McCoy Russell LLP

(57) ABSTRACT

Various methods and systems are provided for detecting a change in turbocharger performance. In one example, a method comprises determining a level of turbocharger imbalance based on output from a turbine speed sensor and generating a signal related to a change in a performance level of the turbocharger if the level of turbocharger imbalance is greater than a threshold.

20 Claims, 13 Drawing Sheets

(56) References Cited

U.S. PATENT DOCUMENTS

| | | |
|---|---|---|
| 8,205,503 B2 | 6/2012 | Cox |
| 8,316,821 B2 | 11/2012 | Lee et al. |
| 8,360,030 B2 | 1/2013 | Walker et al. |
| 8,413,441 B2 | 4/2013 | Pursifull |
| 8,469,657 B2 | 6/2013 | Furman et al. |
| 2005/0155349 A1 | 7/2005 | Sugiura et al. |
| 2005/0218889 A1 | 10/2005 | Yamada et al. |
| 2007/0016385 A1* | 1/2007 | Barila ............... G01P 3/44 702/142 |
| 2007/0283695 A1 | 12/2007 | Figura |
| 2008/0060434 A1 | 3/2008 | Kershaw |
| 2010/0269588 A1 | 10/2010 | Thelen et al. |
| 2013/0042451 A1* | 2/2013 | Dellmann ............... F01D 5/027 29/402.01 |
| 2013/0067911 A1 | 3/2013 | Worden et al. |
| 2014/0000235 A1 | 1/2014 | Kamen et al. |
| 2014/0174074 A1* | 6/2014 | Hilditch ............... F02B 37/12 60/602 |
| 2015/0211951 A1* | 7/2015 | Willis ............... F02C 6/12 73/487 |
| 2015/0260086 A1* | 9/2015 | Wang ............... F02B 37/186 415/145 |

FOREIGN PATENT DOCUMENTS

| | | |
|---|---|---|
| KR | 20120136709 A | 12/2012 |
| WO | 2007114541 A1 | 10/2007 |

OTHER PUBLICATIONS

Riverhawk's IndikonWeb Deflection Detection System; Apr. 9, 2015.

* cited by examiner

METHODS AND SYSTEM FOR A TURBOCHARGER

FIELD

Embodiments of the subject matter disclosed herein relate to a turbocharger coupled to an internal combustion engine.

BACKGROUND

Turbochargers are devices used to increase the power output of an engine by compressing air into the engine with a compressor driven by a turbine that harvests energy from the hot engine exhaust gases. Turbochargers often operate at very high speeds (e.g., 25,000 RPM) and thus changes in the performance or operating condition of the turbocharger during high speed operation may result in degradation to the turbocharger and/or surrounding components. However, some types of turbocharger performance may be difficult to detect. Further, the inclusion of additional sensors to monitor for turbocharger performance may be costly and/or add additional complexity to a vehicle in which the turbocharger is installed.

BRIEF DESCRIPTION

In an embodiment, a method for a turbocharger (e.g., a method for controlling a turbocharger or system associated with a turbocharger) includes determining a level of turbocharger imbalance based on output from a turbine speed sensor, and generating a signal related to a change in a performance level of the turbocharger if the level of turbocharger imbalance is greater than a threshold. For example, the method may include detecting a level of turbocharger imbalance based on one or more of a time domain and frequency domain signal output from a variable reluctance sensor positioned proximate a toothed wheel of the turbocharger and configured to determine the speed of turbocharger during standard operation. In this way, change in turbocharger performance may be determined based on output from an existing turbine speed sensor.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of detecting turbocharger imbalance. The turbocharger includes a turbine with a turbine rotor, which is part of the rotating assembly of the turbine. The speed of a turbocharger shaft may be monitored by a speed sensor. To alleviate turbocharger rotor condition degradation, the turbine speed may be monitored by a variable reluctance sensor (VRS).

A VRS generates a voltage pulse each time a tooth of a wheel coupled to the turbocharger shaft passes underneath the sensor. The amplitude of the voltage pulse is a function of speed and clearance between the top surface of the teeth and a tip of the VRS. As turbocharger imbalance increases, the orbit of the precession motion of the rotor shaft changes to an inclined ellipse. The size of the orbit of the rotor shaft also increases significantly due to the wobbling motion of the turbocharger shaft. When the shape and size of the precession motion orbit changes due to the effects of increasing imbalance, it is reflected in the amplitude of the voltage pulse generated by the VRS.

Thus, according to embodiments disclosed herein, the amplitude of the voltage pulse generated by the VRS may be monitored in order to detect turbocharger imbalance. The signal output by the VRS may be analyzed in the time domain or the frequency domain to detect changes in the amplitude of the signal that reflect turbocharger imbalance. If the level of imbalance is greater than a threshold, one or more actions may be taken to prevent degradation of the turbocharger and/or surrounding components, such as notifying an operator of the vehicle in which the turbocharger is installed, de-rating engine power, and/or bypassing airflow around the turbocharger.

Figure 1:
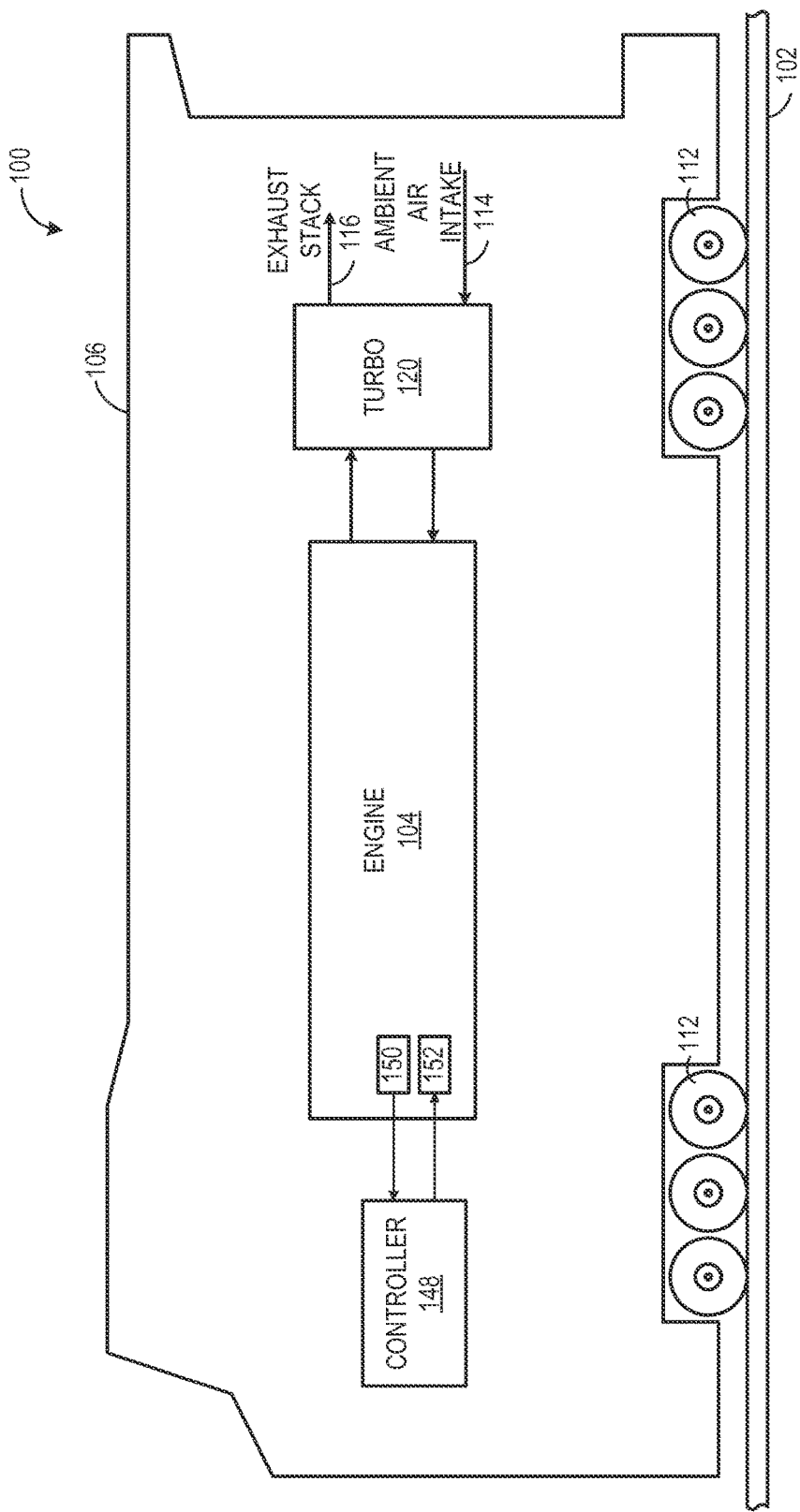
FIG. 1 shows an embodiment of a vehicle system.
Figure 2:
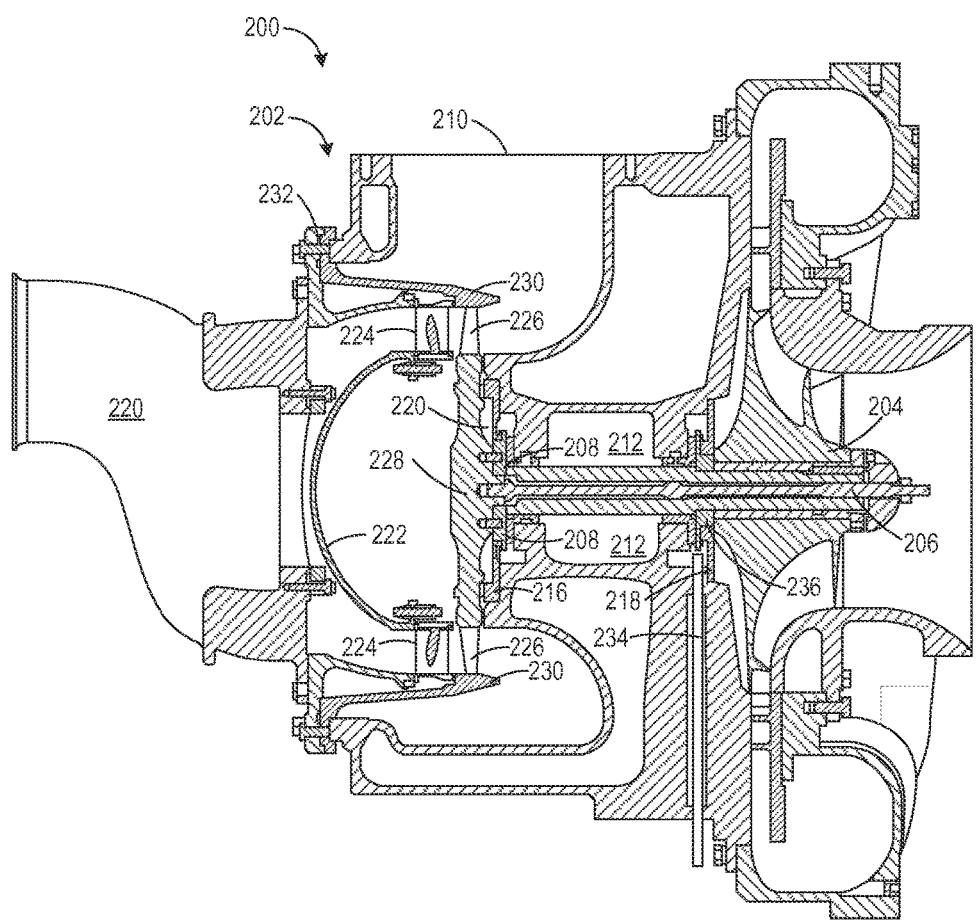
FIG. 2 shows an embodiment of a turbocharger that may be installed in the vehicle system of FIG. 1.

An example of a vehicle system including a turbocharger is illustrated in FIG. 1. FIG. 2 illustrates a turbocharger, such as the turbocharger of FIG. 1, including a VRS sensor. FIGS. 3-6 illustrate various mechanisms that may be used with the output of the VRS of FIG. 2 in order to detect turbocharger imbalance and FIGS. 7-12 illustrate example outputs that may be observed during the execution of the methods of FIGS. 3-6. FIG. 13 illustrates an example circuit that may be used to demodulate the signal output from the VRS, while FIGS. 14-18 illustrate example waveforms that may be output at respective stages of the circuit of FIG. 13.

Figure 19:
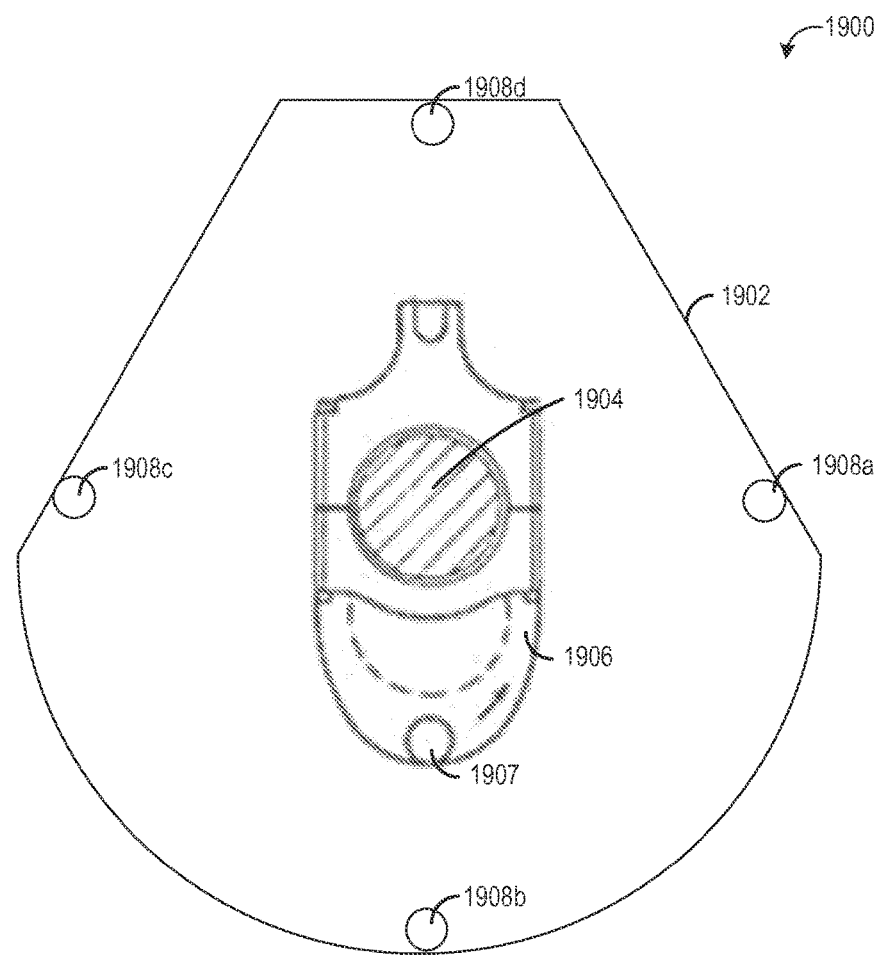
FIG. 19 schematically illustrates an example crankshaft and plurality of proximity sensors.

As explained above, turbocharger imbalance may result in the orbit of the precession motion of the rotor shaft changing to an inclined ellipse, which may be detected by a change in the magnitude of the signal output from the turbocharger speed sensor. Turbocharger imbalance may be caused by various factors, including but not limited to soot build-up on the turbine rotor, bearing degradation, and bending of the turbocharger shaft. Vehicle systems may include other reciprocating members that may also be prone to imbalance. For example, the crankshaft of the engine may experience deflection, where the crankshaft becomes misaligned due to wear on the journal bearings, for example. Accordingly, one or more proximity sensors housed in the crankcase may be used to detect changes in the position of each crankshaft throw in order to detect crankshaft deflection, as shown in FIG. 19.

In one embodiment, the turbocharger described above may be coupled to an engine in a vehicle. A locomotive system is used to exemplify one of the types of vehicles having engines to which a turbocharger, or multi-turbocharger, may be attached. Other types of vehicles may include other types of rail vehicles, on-highway vehicles, and off-highway vehicles other than rail vehicles, such as mining equipment and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system with an engine 104.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 ("TURBO") that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIG. 2.

In some embodiments, the vehicle system 100 may further include an exhaust gas treatment system coupled in the exhaust passage upstream or downstream of the turbocharger 120. In one example embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, turbine speed, etc. Correspondingly, the controller 148 may control the vehicle system 100 by sending commands to various components such as traction motors, alternator, cylinder valves, throttle, etc.

In one embodiment, the controller may include a communication system for reporting one or both of a turbine speed measurement device output or a determined degradation of the turbocharger based on an output of the speed measurement device, as will be described in greater detail below.

FIG. 2 shows an embodiment of a turbocharger 200 that may be coupled to an engine, such as turbocharger 120 described above with reference to FIG. 1. In one example, the turbocharger may be bolted to the engine. In another example, the turbocharger 200 may be coupled between the exhaust passage and the intake passage of the engine. In other examples, the turbocharger may be coupled to the engine by any other suitable manner.

The turbocharger 200 includes a turbine stage 202 and a compressor 204. Exhaust gases from the engine pass through the turbine stage 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

The turbocharger includes a casing 210. In some embodiments, the turbine stage 202 and the compressor 204 may have separate casings which are bolted together, for example, such that a single unit (e.g., turbocharger 200) is formed. As an example, the turbocharger may have a casing made of cast iron and the compressor may have a casing made of an aluminum alloy.

The turbocharger 200 further includes bearings 208 to support the shaft 206, such that the shaft may rotate at a high speed with reduced friction. The two bearings are opposite to each other. A thrust bearing is also present to prevent the axial movement of the turbocharger shaft. As depicted in FIG. 2, the turbocharger 200 further includes two non-contact seals (e.g., labyrinth seals), a turbine labyrinth seal 216 positioned between an oil cavity 212 and the turbine 202 and a compressor labyrinth seal 218 positioned between the oil cavity 212 and the compressor 204.

Exhaust gas may enter through an inlet, such as gas inlet transition region 220, and pass over a nose piece 222. A nozzle ring 224 may include airfoil-shaped vanes arranged circumferentially to form a complete 360° assembly. The nozzle ring 224 may act to optimally direct the exhaust gas to a turbine disc/blade assembly, including blades 226 and a turbine disc 228, coupled to the shaft 206. In some embodiments, the turbine disc and blades may be an integral component, known as a turbine blisk. The rotating assembly of the turbine, including the turbine disc, blades, and shaft, may collectively be referred to as the turbine rotor.

The blades 226 may be airfoil-shaped blades extending outwardly from the turbine disc 228, which rotates about the centerline axis of the engine. An annular shroud 230 is coupled to the casing at a shroud mounting flange 232 and arranged so as to closely surround the blades 226 and thereby define the flowpath boundary for the exhaust stream flowing through the turbine stage 202.

Turbocharger 200 may further include a speed sensor 234. Speed sensor 234 may be configured to determine a speed of the turbine rotor based on interaction between the speed sensor 234 and a notched or toothed wheel 236 of the turbocharger. In some examples, the toothed wheel used to sense rotor/shaft speed may be a turbine thrust collar. The toothed wheel 236 may be annular shaped and substantially surround a portion of shaft 206. As such, the toothed wheel 236 may rotate with shaft 206. Toothed wheel 236 may include a plurality of notches that, when in alignment with a central axis of speed sensor 234, cause an increase in the voltage output by speed sensor 234. Based on the frequency of this voltage output, the speed of the turbocharger may be determined.

Speed sensor 234 may be a variable reluctance sensor in one example. Other speed sensors are also possible, such as a Hall effect sensor. Speed sensor 234 may include a magnet at the face of the speed sensor positioned adjacent to toothed wheel 236 or other toothed wheel coupled and/or configured to rotate with shaft 206. As a notch or tooth of the toothed wheel 236 passes by the face of speed sensor 234, the amount of magnetic flux passing through the magnet may increase, resulting in an increased voltage signal. The magnitude of the signal output by speed sensor 234 may be a function of the distance between the speed sensor 234 and each tooth of the toothed wheel 236. As explained in more detail below, the signal output from the speed sensor 234 may be analyzed to determine the magnitude of the signal for each tooth. Imbalance in the turbocharger may be detected if the magnitude of the signal varies, e.g., if the magnitude is larger than expected for at least one tooth of the wheel.

Figure 3:
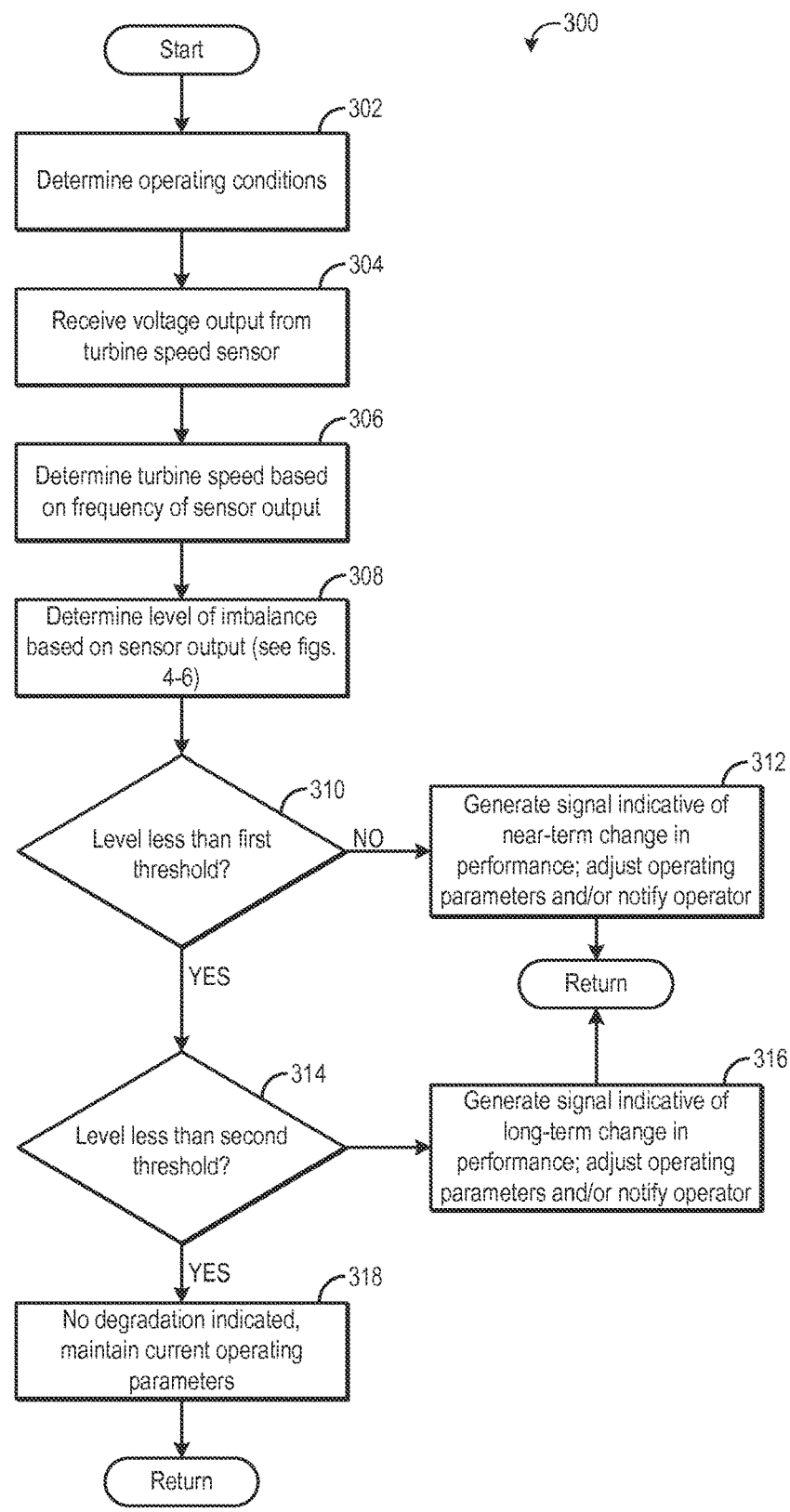
FIG. 3 is a high level flow chart illustrating an example method for detecting a change in turbocharger performance.

Turning now to FIG. 3, a method 300 for determining a change in turbocharger performance is indicated. Method 300 may be carried out at least in part by a controller, such as controller 148 of FIG. 1, according to non-transitory instructions stored in memory of the controller, to determine a level of imbalance in the turbocharger based on feedback from a turbine speed sensor, such as sensor 234.

At 302, engine operating parameters are determined. The engine operating parameters may include, but are not limited to, designated boost pressure, engine speed, and engine load. At 304, method 300 includes receiving voltage output from a turbine speed sensor. At 306, turbine speed is determined based on the frequency of the voltage output received from the speed sensor. In some embodiments, the turbine speed may be determined only if the turbocharger is engaged and/or rotating above a threshold speed, which may be estimated based on the engine speed, load, designated boost pressure, etc.

At 308, a level of imbalance in the turbocharger is determined based on the signal output from the speed sensor. Various examples of how to determine a level of imbalance based on turbine speed sensor output are presented below with respect to FIGS. 4-6. Briefly, as explained above, the amplitude of the voltage pulse output from the speed sensor is a function of speed and clearance between the top surface of the teeth and sensor tip. The clearance is analyzed to detect imbalance. When the shape and size of the precession motion orbit of the rotor shaft changes due to the effects of increasing imbalance, it is reflected in the amplitude of the voltage pulse generated by the speed sensor. The amplitude of the voltage pulse may be analyzed in the time domain or the frequency domain in order to detect imbalance, as will be explained below.

At 310, the level of turbocharger imbalance is compared to a first threshold in order to determine if the level is less than the first threshold. The first threshold may be a relatively high level of imbalance at which operation of the turbocharger may be undesired, as possible degradation to the turbocharger or other vehicle system components may occur. Accordingly, if the level of imbalance is not less than the first threshold, method 300 proceeds to 312 to generate a signal indicative of a near-term change in turbocharger performance. When a near-term change in turbocharger performance is detected, one or more engine operating parameters may be adjusted and/or an operator may be notified of the change in performance. For example, engine power may be derated to allow operation of the turbocharger at a lower speed, such that the likelihood of turbocharger degradation is lowered. In another example, exhaust flow may be bypassed around the turbine. In a further example, the engine may be shutdown to avoid degradation. Method 300 then returns.

If it is determined at 310 that the level of imbalance is less than the first threshold, method 300 proceeds to 314 to determine if the level of imbalance is less than a second threshold. The second threshold may be lower than the first threshold and may reflect a level of imbalance at which the turbocharger may still be able to operate without causing near-term degradation, but yet may eventually cause degradation if allowed to operate in the long-term. Accordingly, if it is determined that the level of imbalance is not less than the second threshold, method 300 proceeds to 316 to generate a signal indicative of a long-term change in turbocharger performance. When a long-term change in turbocharger performance is indicated, one or more operating parameters may be adjusted and/or an operator may be notified. In one example, the operating parameters may be maintained at current levels, but the operator may be notified of the potential for long-term degradation. In this way, the turbocharger imbalance may be corrected via future maintenance, without disrupting the current operation. In other examples, the turbocharger may continue to be operated, but at a lower speed and/or with less exhaust flow to avoid exacerbating the relatively low level of imbalance until the imbalance can be addressed. Method 300 then returns.

If it is determined that the level of imbalance is less than the second threshold, it may be determined that no detectable imbalance is present, and thus method 300 proceeds to 318 to indicate no change in turbocharger performance. Method 300 then returns.

Figure 4:
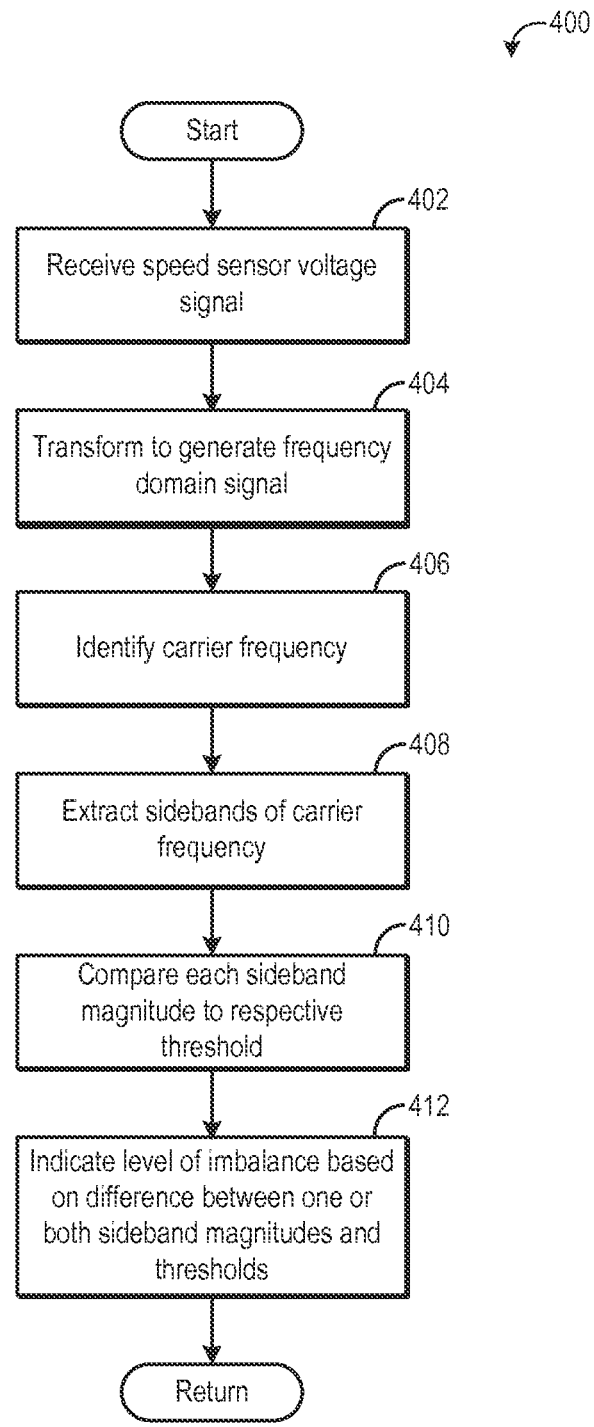
FIG. 4 is a flow chart illustrating an example method for determining a level of turbocharger imbalance.

FIG. 4 is a flow chart illustrating a first method 400 for detecting turbocharger imbalance based on output from a turbine speed sensor. Method 400 may be executed as part of method 300 above. Method 400 includes analysis of the voltage signal output form the speed sensor in the frequency domain and specifically compares the magnitude of one or more sidebands of the carrier frequency of the frequency domain signal. The toothed wheel used by the sensor to measure turbocharger speed includes "N" teeth, such as eight teeth. Therefore, an N per revolution frequency component of the sensor voltage signal output is the carrier frequency. The N per revolution frequency component may also be referred to as the N× frequency component. Imbalance may affect the once per revolution (1×) and two per revolution (2×) frequency components of displacement during rotation of a shaft. The effect on the 2× frequency component is relatively small if it is compared to the effect on the 1× frequency. Therefore, the 1× frequency component acts as the modulating signal for the N× carrier frequency of the toothed wheel. In the frequency spectrum, this amplitude modulation of the voltage signal results in increasing amplitude of the side bands at N−1× and N+1× frequency components with increasing imbalance. Tracking the amplitude of the side bands from the output of the sensor voltage signal can therefore be used to detect imbalance in an operating vehicle.

At 402, method 400 includes receiving a speed sensor voltage signal. As explained above, the speed sensor may be a variable reluctance sensor (VRS) that outputs a voltage signal each time a tooth from a toothed wheel passes under the sensor. The frequency of the voltage signal may be analyzed to determine the speed at which the wheel, and hence the rotating body to which it is coupled (e.g., turbine rotor), is rotating. An example voltage signal output from a VRS is illustrated and explained in more detail below with respect to FIG. 7.

At 404, the received voltage signal is transformed to generate a frequency domain signal. The voltage signal may be transformed according to a suitable transformation, such as fast Fourier transform, Goertzel transform, or other transformation. At 406, the carrier frequency of the transformed signal is identified. In one example, the carrier frequency may be the frequency that represents the number of voltage outputs (e.g., "events") present in the signal for each revolution of the toothed wheel. For example, if the wheel has N teeth, the carrier frequency may be the N per revolution (N× frequency. In a more specific example, if the wheel has eight teeth, the carrier frequency may be the eight per revolution (8×) frequency component of the transformed signal.

At 408, one or more sidebands of the carrier frequency are extracted. In one example, the sideband frequency components on each side of the carrier frequency may be extracted. For example, the sidebands may include the N+1 frequency and the N−1 frequency, or the N+2 and the N−2 frequency. In the example presented above, the N−1 and N+1 frequency components include the 7× and 9× frequency components, respectively. An example of a first sideband frequency component and a second sideband frequency component are illustrated and explained in more detail below with respect to FIGS. 11 and 12.

At 410, the magnitude of each sideband frequency is compared to a respective threshold. At 412, the level of imbalance is indicated based on one or both of the sidebands relative to their respective thresholds. For example, turbocharger imbalance may be indicated if one or both sidebands have a magnitude that is greater than their respective thresholds, or only if both sideband magnitudes are greater than their respective thresholds. Further, imbalance may only be indicated if one or both sidebands is greater than their respective thresholds by a threshold amount, such as at least 10% greater than the threshold. Further still, the level of imbalance indicated may correlate to the amount one or both of the sidebands exceeds it respective threshold. For example, if the N+1 sideband magnitude exceeds the N+1 threshold by 10%, a relatively low level of imbalance may be indicated, but if it exceeds the threshold by 50%, a relatively high level of imbalance may be indicated.

The threshold magnitude for each sideband may be a magnitude observed when no turbocharger imbalance is present. In this way, any level of imbalance may be detected. In other examples, the threshold magnitude may represent the magnitude observed when a relatively small amount of imbalance is present. Further, the threshold magnitude of each sideband may be a fixed threshold, or it may change based on operating conditions, such as turbine speed. Method 400 then returns.

Figure 5:
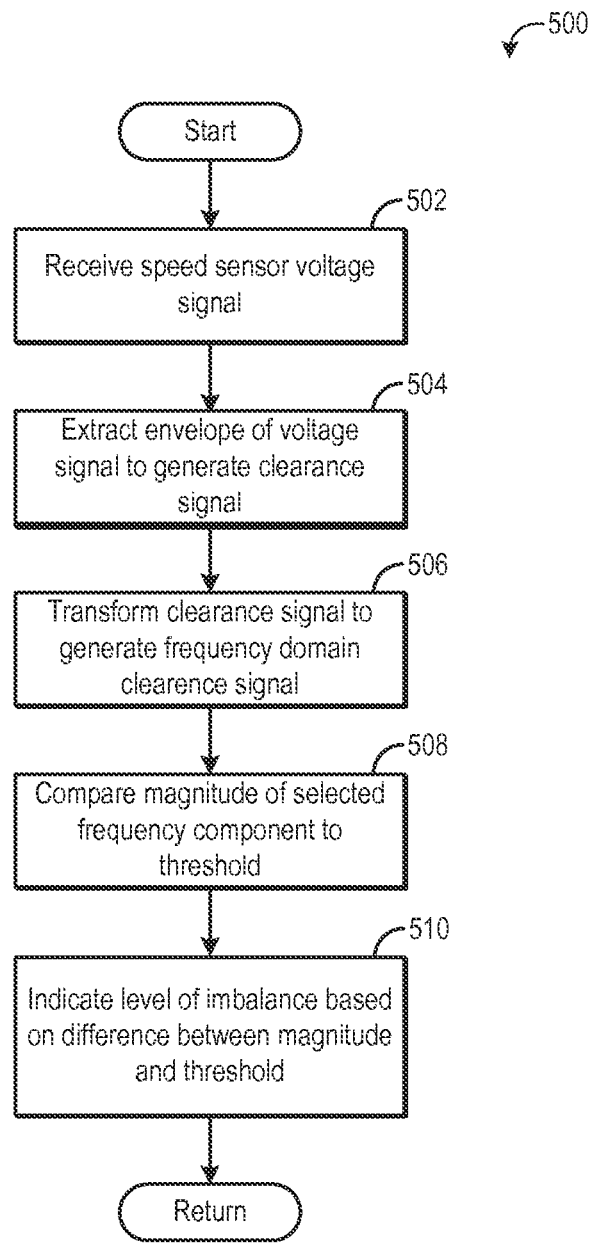
FIG. 5 is a flow chart illustrating another example method for determining a level of turbocharger imbalance.

FIG. 5 is flow chart illustrating a second method 500 for detecting turbocharger imbalance based on output from a turbine speed sensor. Method 500 may be executed as part of method 300 above. Method 500 exploits the physics of amplitude modulation of the voltage signal from speed sensor to detect imbalance. The peaks of the pulse amplitudes of the voltage signal are detected and used to define the envelope of the sensor voltage signal. This envelope is used to detect imbalance in the time domain (described in more detail below with respect to FIG. 6), as well as frequency domain (as will be described herein with respect to FIG. 5). Once a transformation of the envelope is performed, the frequency domain signal components are analyzed to detect imbalance. Specifically, the 1× (also referred to as the once per revolution) component increases monotonically with increasing imbalance. This approach to detecting imbalance may present a low level of complexity for executing via the controller. For example, an analog circuit may receive as input the output voltage signal from the speed sensor. The analog circuit may extract and output the envelope of the signal. This envelope can be sampled at a very low sampling frequency and the transformation of this digital signal may provide the amplitude of the 1× frequency component that can be tracked in order to detect imbalance.

At 502, method 500 includes receiving a speed sensor voltage signal. As explained above, the speed sensor may be a variable reluctance sensor (VRS) that outputs a voltage signal each time a tooth from a toothed wheel passes under the sensor. The frequency of the voltage signal may be analyzed to determine the speed at which the wheel, and hence the rotating body to which it is coupled (e.g., turbine rotor), is rotating. An example voltage signal output from a VRS is illustrated and explained in more detail below with respect to FIG. 7.

At 504, the envelope of the voltage signal is extracted to generate a clearance signal. An example clearance signal extracted from a VRS voltage signal output is illustrated and explained in more detail below with respect to FIGS. 7 and 8. At 506, the clearance signal is transformed to generate a frequency domain clearance signal. The envelope signal may be transformed according to a suitable transformation, such as fast Fourier transform, Goertzel transform, or other transformation. At 508, the magnitude of a selected frequency component is compared to a threshold. As explained above, the selected frequency component may include the once per revolution frequency component. Example selected frequency components extracted in the manner described above are illustrated and explained in more detail below with respect to FIG. 10.

The threshold may be a magnitude of the selected frequency component that is observed when no turbocharger imbalance is present. In this way, any level of imbalance may be detected. In other examples, the threshold may represent the magnitude of the selected frequency component that is observed when a relatively small amount of imbalance is present. Further, the threshold may be a fixed threshold, or it may change based on operating conditions, such as turbine speed.

At 510, method 500 includes indicating a level of imbalance based on the difference between the magnitude of the selected frequency component and the threshold. For example, turbocharger imbalance may be indicated if the magnitude of the selected frequency component is greater than the threshold. Further, imbalance may only be indicated if the magnitude is greater than the threshold by a threshold amount, such as at least 10% greater than the threshold. Further still, the level of imbalance indicated may correlate to the amount the magnitude of the selected frequency component exceeds the threshold. For example, if the selected frequency component magnitude exceeds the threshold by 10%, a relatively low level of imbalance may be indicated, but if it exceeds the threshold by 50%, a relatively high level of imbalance may be indicated. Method 500 then returns.

Figure 6:
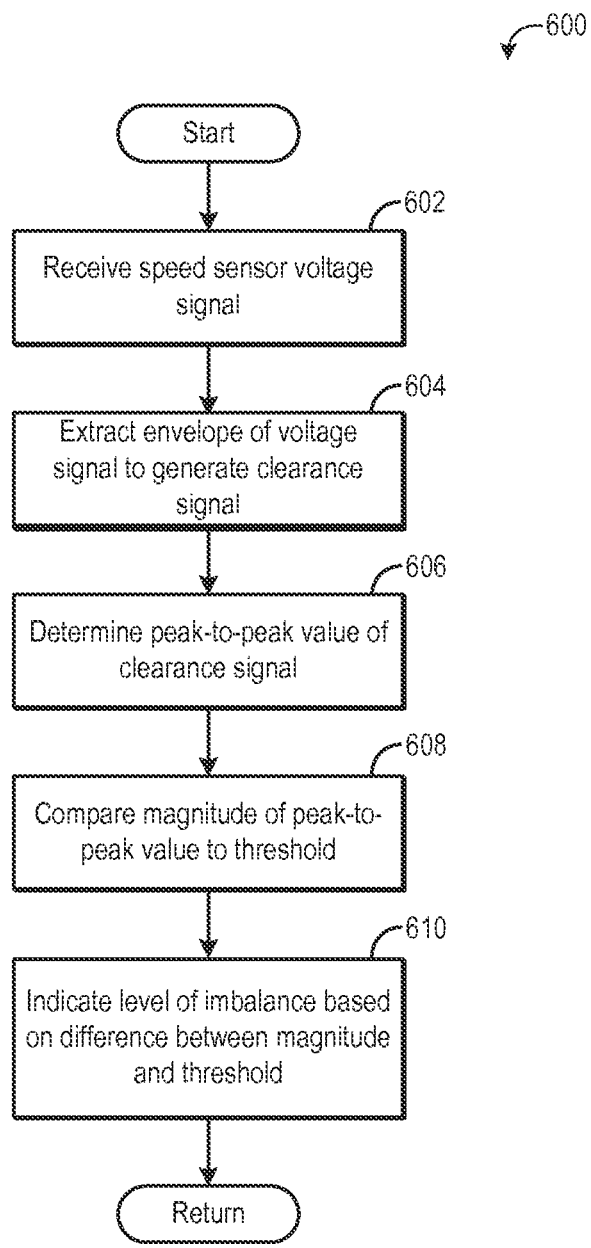
FIG. 6 is a flow chart illustrating a further example method for determining a level of turbocharger imbalance.

FIG. 6 is flow chart illustrating a third method 600 for detecting turbocharger imbalance based on output from a turbine speed sensor. Method 600 may be executed as part of method 300 above. Similar to method 500 described above, method 600 exploits the physics of amplitude modulation of the voltage signal from speed sensor to detect imbalance. The peaks of the pulse amplitudes of the voltage signal are detected and used to define the envelope of the sensor voltage signal. This envelope is used to detect imbalance in the time domain.

At 602, method 600 includes receiving a speed sensor voltage signal. As explained above, the speed sensor may be a variable reluctance sensor (VRS) that outputs a voltage signal each time a tooth from a toothed wheel passes under the sensor. The frequency of the voltage signal may be analyzed to determine the speed at which the wheel, and hence the rotating body to which it is coupled (e.g., turbine rotor), is rotating.

At 604, the envelope of the voltage signal is extracted to generate a clearance signal. An example voltage signal output from a VRS and corresponding clearance signal are illustrated and explained in more detail below with respect to FIGS. 7 and 8. At 606, the peak-to-peak value of the clearance signal is determined. The peak-to-peak value of the clearance signal may represent the average of each peak-to-peak value observed for all peaks in the clearance signal in one example. In another example, the peak-to-peak value determined at 606 may be the largest peak-to-peak value that is observed in the clearance signal.

At 608, the magnitude of the peak-to-peak value is compared to a threshold. The threshold may be a magnitude of the peak-to-peak value that is observed when no turbocharger imbalance is present. In this way, any level of imbalance may be detected. In other examples, the threshold may represent the magnitude of the peak-to-peak value that is observed when a relatively small amount of imbalance is present. Further, the threshold may be a fixed threshold, or it may change based on operating conditions, such as turbine speed.

At 610, method 600 includes indicating a level of imbalance based on the difference between the magnitude of the peak-to-peak value and the threshold. For example, turbocharger imbalance may be indicated if the magnitude of the peak-to-peak value is greater than the threshold. Further, imbalance may only be indicated if the magnitude is greater than the threshold by a threshold amount, such as at least 10% greater than the threshold. Further still, the level of imbalance indicated may correlate to the amount the magnitude of the peak-to-peak value exceeds the threshold. For example, if the peak-to-peak magnitude exceeds the threshold by 10%, a relatively low level of imbalance may be indicated, but if it exceeds the threshold by 50%, a relatively high level of imbalance may be indicated. Method 600 then returns.

Figure 7:
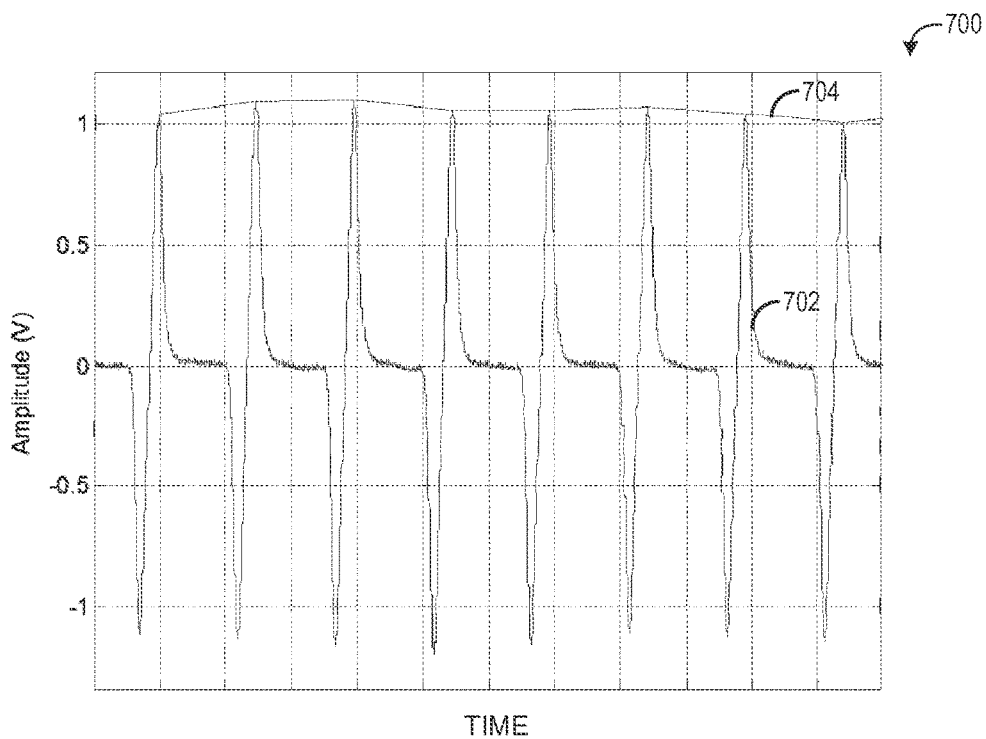
FIG. 7 is a diagram illustrating example voltage signal output from a VRS.

FIG. 7 is a diagram 700 illustrating an example output from a turbocharger speed sensor, such as a VRS sensor. Time is depicted along the horizontal (x) axis and voltage amplitude is depicted along the vertical (y) axis. The voltage signal output from the VRS is illustrated by curve 702. As described above, the voltage signal includes a voltage pulse each time a tooth of the toothed wheel passes under the VRS. Diagram 700 shows the voltage pulses for eight teeth. In examples where the wheel includes eight teeth, the eight voltage pulses shown in FIG. 7 represent the pulses observed during one revolution of the wheel. Also shown in FIG. 7 is the envelope 704, also referred to as the clearance signal. As appreciated by FIG. 7, the envelope tracks the upper peak voltages of the voltage signal.

Figure 8:
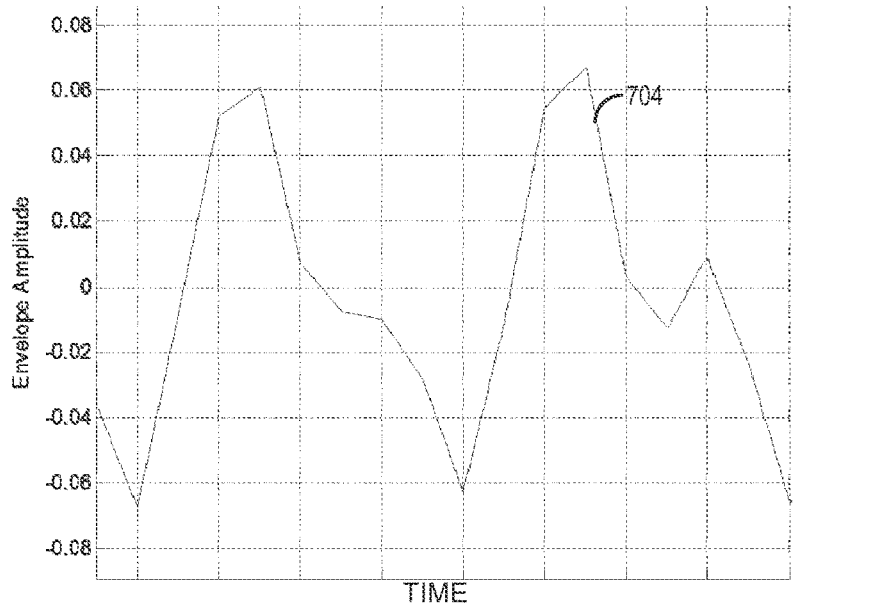
FIG. 8 is a diagram illustrating an example clearance signal.

FIG. 8 is a diagram 800 illustrating a zoomed in view of the envelope 704 shown in FIG. 7. While time is also depicted along the horizontal axis in diagram 800, the vertical axis depicts the envelope amplitude. The envelope amplitude may include a deviation of the envelope relative to an average envelope value. For example, the average value of the envelope signal may be set to zero, and changes in the signal relative to the average may be plotted. Further, the envelope 704 illustrated in diagram 800 may include the envelope for two revolutions of the wheel as opposed to the single revolution shown in FIG. 7.

Figure 9:
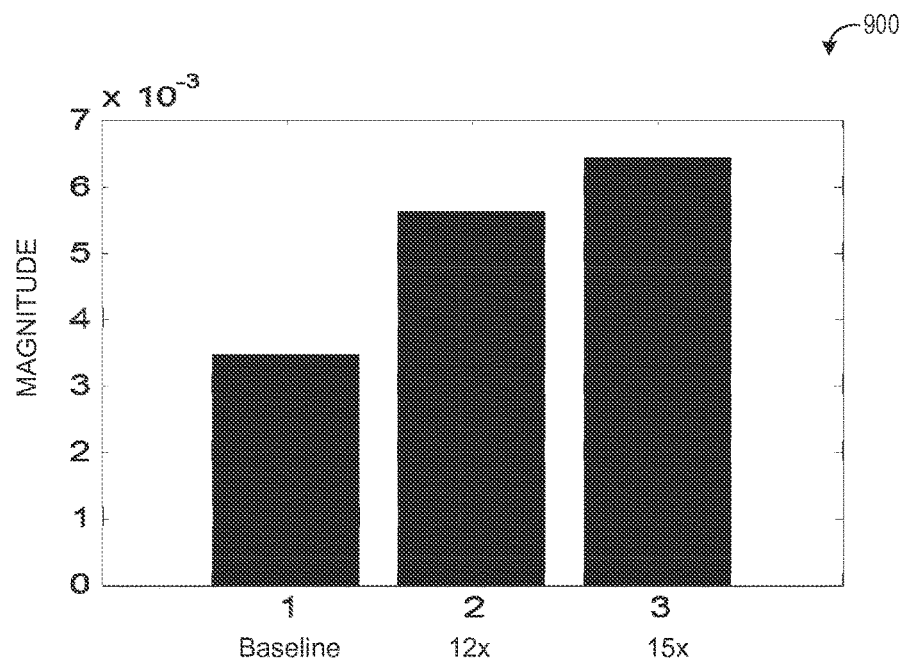
FIGS. 9-12 are diagrams illustrating example imbalance magnitudes that may be observed according to the methods illustrated in FIGS. 4-6.

FIG. 9 is a diagram 900 illustrating example magnitudes of peak-to-peak values that may be observed during execution of method 600, for example. Diagram 900 is a bar graph that illustrates the magnitude of peak-to-peak values (e.g., an average peak-to-peak value) of an envelope or clearance signal, such as the envelope shown in FIGS. 7 and 8. The first bar (bar 1) represents a baseline amount of imbalance, such as no imbalance or a relatively small amount of imbalance, as would be expected in a turbocharger exhibiting sufficient performance. The second bar (bar 2) represents 12 times the amount of imbalance as the baseline imbalance, while the third bar (bar 3) represents 15 times the amount of imbalance as the baseline. As appreciated from diagram 900, the magnitude of the peak-to-peak values for the 12× and 15× imbalances is greater than the baseline magnitude. For example, the peak-to-peak magnitude for both the 12× and 15× imbalances may be 50% greater than the baseline magnitude, or greater than 50%.

Figure 10:
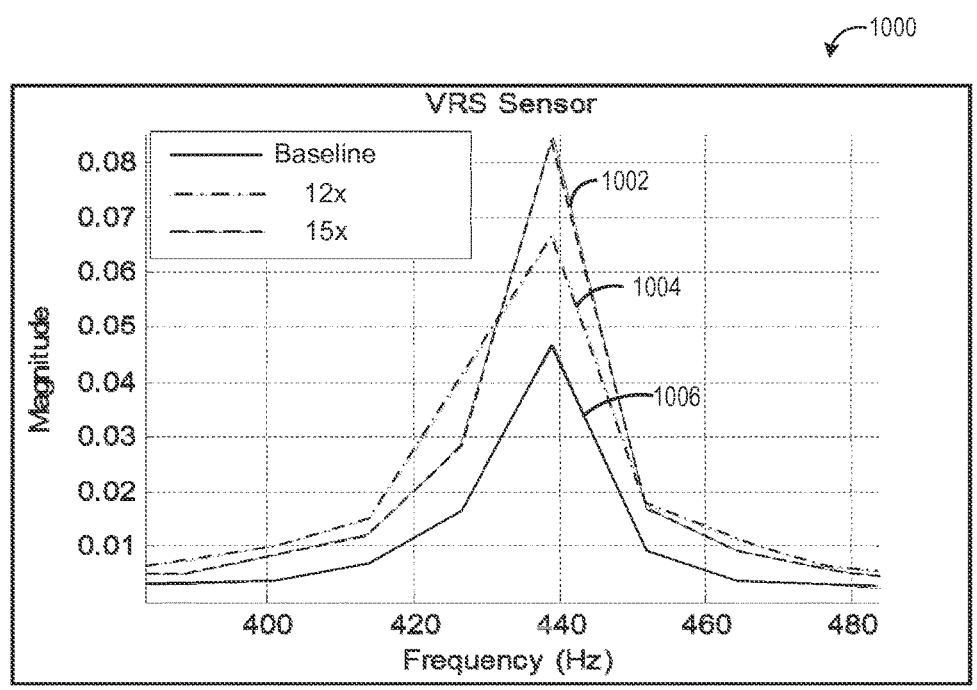

FIG. 10 is a diagram 1000 illustrating example magnitudes of a selected frequency component, such as a once per revolution frequency component of a transformed clearance signal, that may be observed during execution of method 500, for example. Diagram 1000 depicts frequency along the horizontal (x) axis and magnitude along the vertical (y) axis. Similar to diagram 900 described above, diagram 1000 plots frequency components extracted from a signal output during turbocharger operation with a baseline level of imbalance (curve 1006), 12× level of imbalance (curve 1004), and 15× level of imbalance (curve 1002). The magnitude of the selected frequency component for the signal received while the turbocharger is operating with the baseline level of imbalance is less than the magnitudes of the selected frequency component for each of the 12× and 15× levels of imbalance. For example, the 15× level of imbalance may have a magnitude that is nearly twice as large as the magnitude for the baseline imbalance.

Figure 11:
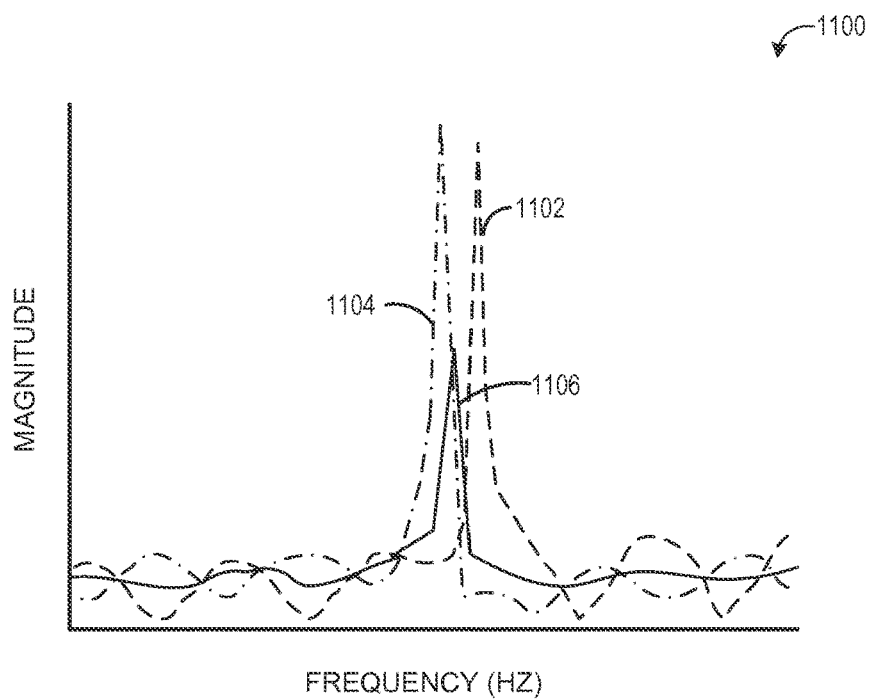

FIG. 11 is a diagram 1100 illustrating example magnitudes for a first sideband of a transformed VRS voltage signal that may be observed during execution of method 400, for example. Diagram 1100 depicts frequency along the horizontal (x) axis and magnitude along the vertical (y) axis. Similar to diagrams 900 and 1000 described above, diagram 1100 plots a first sideband frequency component extracted from a signal output during turbocharger operation with a baseline level of imbalance (curve 1106), 12× level of imbalance (curve 1104), and 15× level of imbalance (curve 1102). Diagram 1100 specifically illustrates the N-1X sideband, where N represents the number of teeth on the speed wheel of the turbocharger. As shown, the magnitude of the first sideband frequency component for the signal received while the turbocharger is operating with the baseline level of imbalance is less than the magnitudes of the first sideband frequency component for each of the 12× and 15× levels of imbalance. For example, the 12× level of imbalance may have a magnitude that is nearly twice as large as the magnitude for the baseline imbalance.

Figure 12:
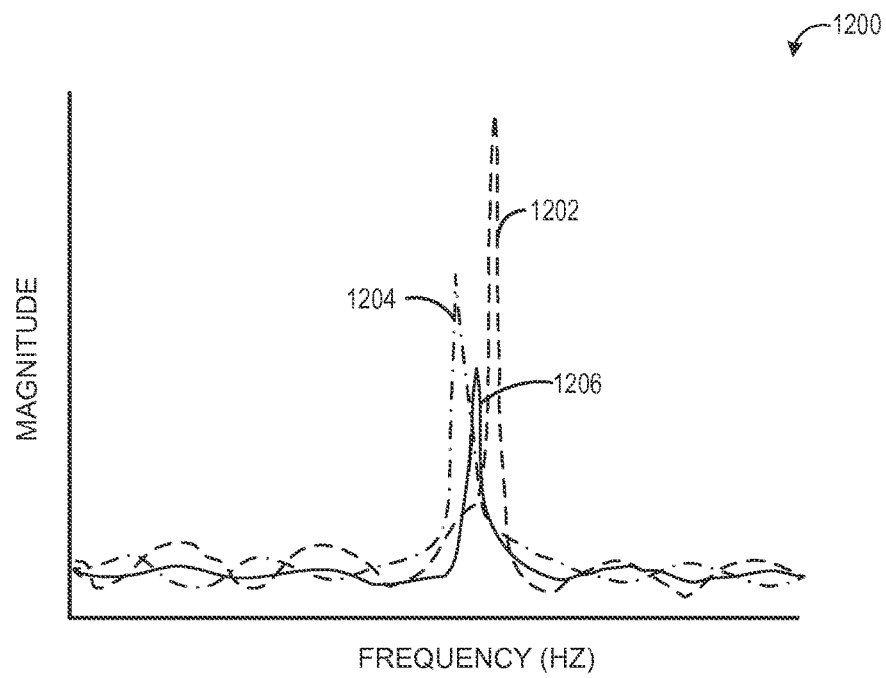
Figure 13:
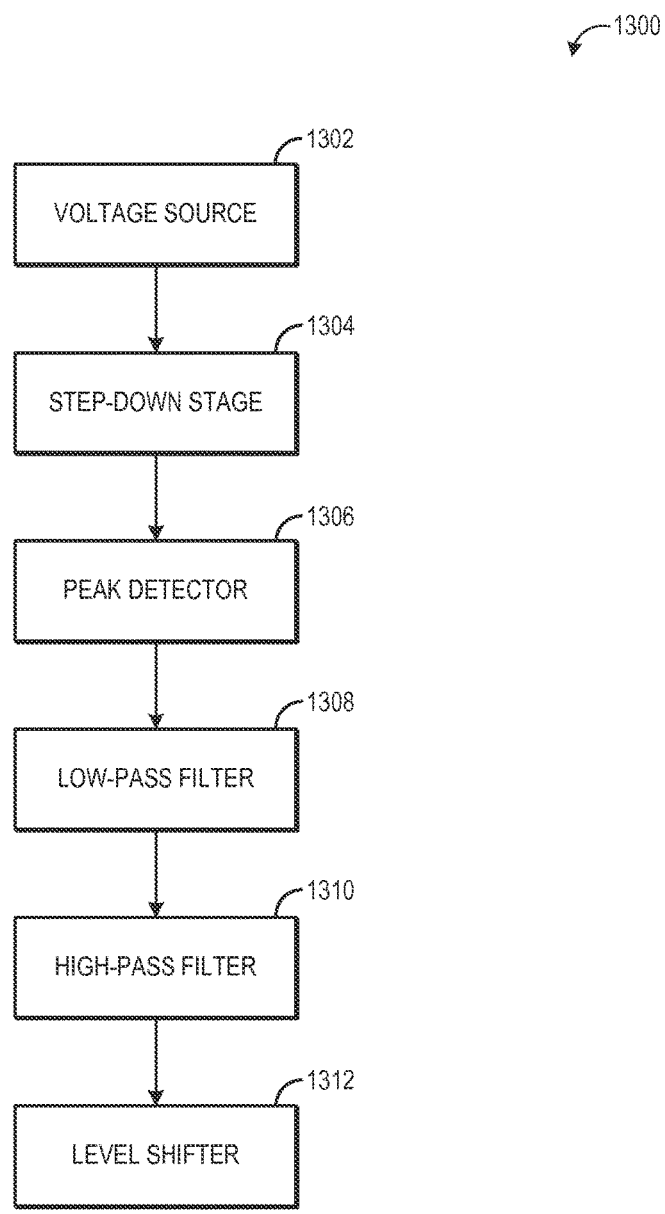
FIG. 13 is a diagram illustrating an example circuit for determining a magnitude of turbocharger imbalance.

FIG. 12 is a diagram 1200 illustrating example magnitudes for a second sideband of a transformed VRS voltage signal that may be observed during execution of method 400, for example. Diagram 1200 depicts frequency along the horizontal (x) axis and magnitude along the vertical (y) axis. Similar to diagrams 900, 1000, and 1100 described above, diagram 1200 plots a second sideband frequency component extracted from a signal output during turbocharger operation with a baseline level of imbalance (curve 1206), 12× level of imbalance (curve 1204), and 15× level of imbalance (curve 1202). Diagram 1200 specifically illustrates the N+1× sideband, where N represents the number of teeth on the speed wheel of the turbocharger. As shown, the magnitude of the second sideband frequency component for the signal received while the turbocharger is operating with the baseline level of imbalance is less than the magnitudes of the first sideband frequency component for each of the 12× and 15× levels of imbalance. For example, the 15× level of imbalance may have a magnitude that is nearly twice as large as the magnitude for the baseline imbalance.

Further, as appreciated by diagrams 1100 and 1200, the magnitude of the sideband frequency components may differ between the first sideband and the second sideband. For example, the magnitude of curve 1104 may be significantly larger than the magnitude of curve 1204. Thus, while the magnitude of the second sideband frequency component may not indicate imbalance, the magnitude of the first sideband frequency may indicate imbalance. As such, imbalance may be indicated even if only one sideband frequency component indicates imbalance.

Turning now to FIG. 13, a circuit 1300 for demodulating the voltage output signal of the turbocharger speed sensor is shown. As explained above, speed sensor has a pulse train output signal. The fundamental frequency of this signal is given by N*w/60 where N=number of teeth, w=rotational RPM. The amplitude of this pulse train is constant for a perfectly balanced turbo. In the presence of an imbalance, the pulse train is amplitude modulated with a modulation frequency=w/60 and the magnitude is proportional to extent of imbalance. The circuit 1300 illustrated in FIG. 13 extracts the magnitude of this modulation from the raw sensor output and renders it fit for sampling by a data acquisition unit (digitizer). In one example, the circuit 1300 illustrated in FIG. 13 may be utilized to extract the modulated VRS frequency to enable imbalance detection according to the method 600 described above with respect to FIG. 6.

Figure 14:
FIGS. 14-18 are diagrams illustrating example waveforms output from the circuit of FIG. 13.
Figure 15:
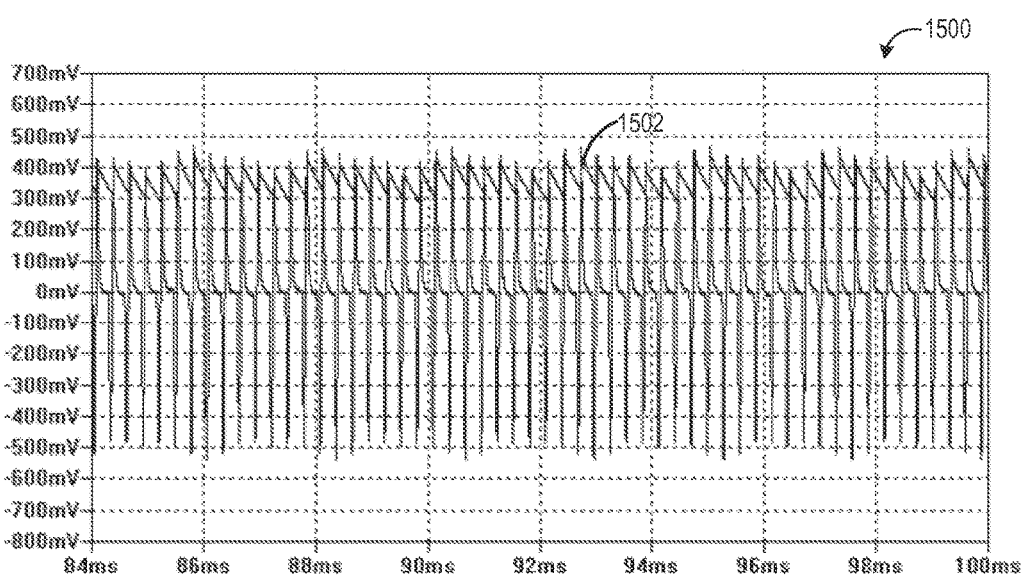

Circuit 1300 includes a step-down stage 1304 that receives voltage output from a voltage source 1302 (e.g., the output from the VRS). The step-down stage scales the voltage output down to a given percentage of the raw voltage output, such as 2.5%. FIG. 14 illustrates an example input signal 1400 to the circuit from a speed sensor, such as a VRS and an example output signal 1410 of the step down stage. The output from the step-down stage 1304 is input into a peak detector stage 1306. The peak detector stage 1306 tracks the positive peaks of the voltage signal (e.g., generates the envelope described above). The discharge time of the peak detector stage may be selected such that relatively low amplitude peaks are not missed due to insufficient discharge, while avoiding excessive discharge which causes reduction in envelope detection accuracy. FIG. 15 is a diagram 1500 illustrating peak detector output 1502 that tracks the peaks of the stepped down VRS signal (e.g., output signal 1410 of FIG. 14).

Figure 16:
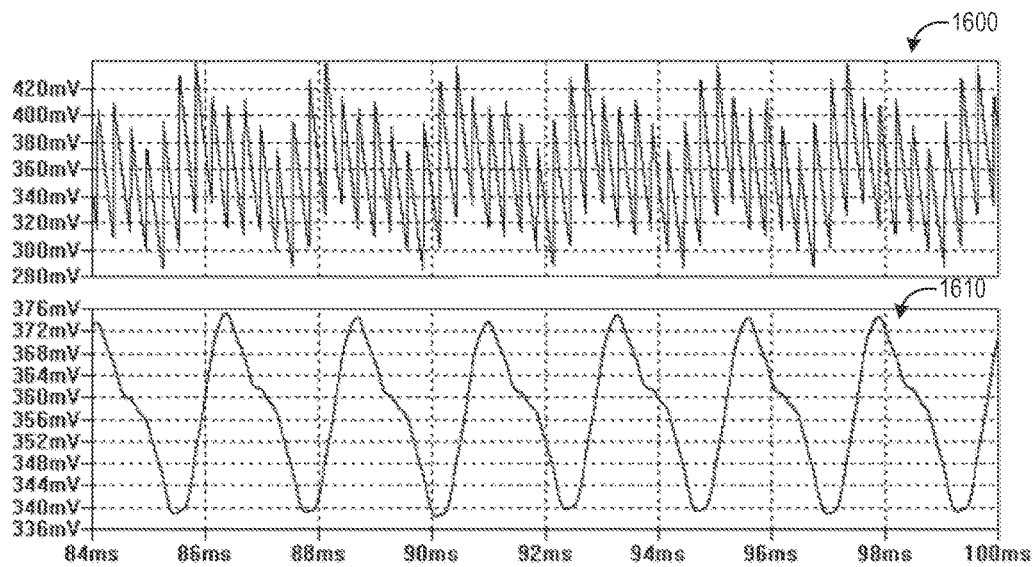
Figure 17:
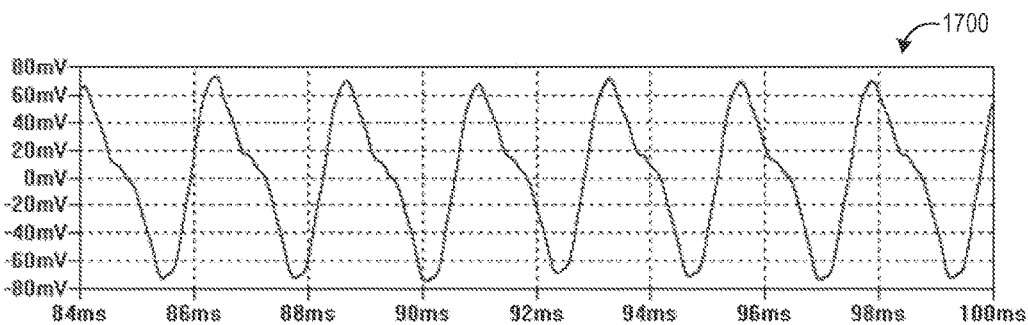
Figure 18:
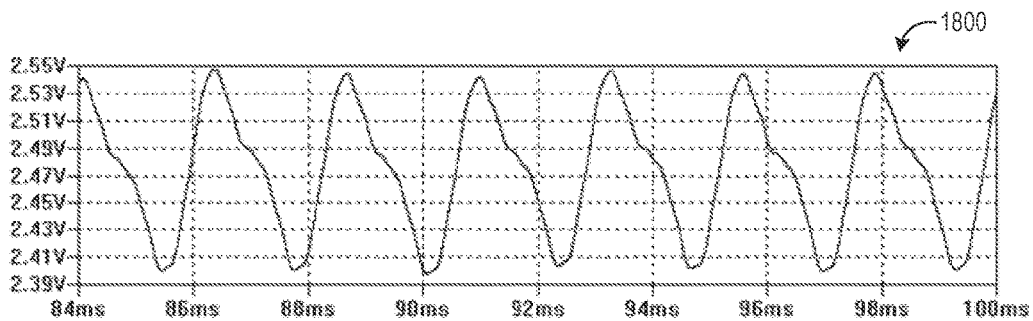

The output from the peak detector stage 1306 is input into a low pass filter 1308. The low pass filter 1308 extracts a smooth envelope from the peak detector output, which may be rich with harmonics. FIG. 16 illustrates an example peak detector output signal 1600 that is input to the low-pass filter and an example low-pass filter output 1610. In one example, the low pass filter is a fourth order filter, but other filters are possible. The output from the low pass filter 1308 is input into a high pass filter 1310. The high pass filter eliminates DC from the detected envelope, and further adds gain. In one example, the high pass filter is a second order filter, but other filters are possible. FIG. 17 is a diagram 1700 that illustrates example zero mean output from the high-pass filter. The output from the high pass filter is input into a level shifter stage 1312. The level shifter stage shifts the output mean from the high pass filter to a mean that is designated for use in a given analog to digital converter (ADC). In one example, the level shifter shifts the mean output to +2.5V. In other examples, the level shifter may shift the output based on the input range of the ADC. FIG. 18 is a diagram 1800 illustrating example level-shifted demodulator circuit output.

The output from the level shifter may then be digitized by an ADC, and the digitized output may be analyzed by a controller to determine, for example, the average peak-to-peak value. This average peak-to-peak value may increase monotonically as imbalance increases. In one example, a baseline level of imbalance may generate an average peak-to-peak value of 100 mV, while a 12× level of imbalance and 15× level of imbalance may each generate greater average peak-to-peak values, such as 133 mV and 143 mV, respectively.

Utilizing the circuit described above decreases the costs and complexity of the controller needed to detect imbalance. For example, in absence of this circuit, the data acquisition capabilities of the controller would need to be relatively sophisticated and complex, otherwise the rapid pulse sequence would be difficult to sample accurately and the modulation magnitude may not be computable. This would entail a significant cost and complexity increase which the described circuit avoids through the use of simple yet efficient analog signal processing circuitry. Also, the described circuit may increase the ability to retrofit existing platforms.

The examples described above for determining imbalance were described with respect to imbalance of a turbocharger shaft. However, other components of a vehicle system may also be prone to imbalance, such as a crankshaft of the engine. In particular, large engines that may be used in marine vehicles or other large vehicles may be prone to crankshaft imbalance (also referred to as crankshaft deflection). Crankshafts may bend over a period of time due to either misalignment during assembly or uneven bearing wear. Crankshafts may include crank-webs, crank-pins, and journals along its length. The weight of the crankshaft is supported by the main bearings at the journals. Over a period of time as the engine keeps running, the wear in the bearings may not be uniform across the entire length of the crankshaft. This means that the crankshaft will not remain in an initial straight line but will get bent either upward or downwards to a slight degree, which may not be visible with the naked eye but could be sufficient to cause fatigue in the crank-webs, eventually causing degradation to the engine or other components.

Crankshaft deflection may be determined by measuring deflection of each crank-web manually using a dial gauge, for example, placed between the crank webs. The web deflections may be measured at four points: top, bottom, left, and right. The deflection may not be measured when the piston is at bottom dead center (BDC), and thus two adjacent points to BDC are typically measured when using a dial gauge.

To measure the deflection, the engine typically is stopped, and in some vehicle configurations (e.g., marine vehicles) a period of time needs to elapse (e.g., at least for 1 hour) before the crankcase doors can be opened. After this, an operator has to enter into the crankcase to fit the dial gauge into the crankshaft web. The biggest concern in this process is a foreign object falling into the oil sump and going undetected, which upon engine start might be damage the bearings. Further, there may be some error from person to person in installing the dial gauge on to the crank web and/or error while taking readings at the five designated points. Additionally, this process needs to be repeated for each cylinder, and for each cylinder typically takes about 15 minutes.

Thus, according to embodiments disclosed herein, to eliminate the use of a manual dial gauge, four proximity sensors for each crankshaft throw are mounted on the crankcase wall. Each sensor will correspond to the four measurement points: top, bottom, side 1, and side 2. There will be a reference point on each throw. When the system is powered on and the engine is rotated, for example when the engine is barred using barring over gear or rotated with an electric motor, the proximity sensors will pick-up the distance and relay the information to a controller (e.g., controller 148) and plot the determined distances in the form of a graph, for example. In just two rotations of the engine, irrespective of the number of cylinders, web deflection data can be measured.

FIG. 19 schematically shows an example engine system 1900 including a crankcase 1902 housing a crankshaft 1904. The engine system 1900 may be included as part of the vehicle system illustrated in FIG. 1, for example, the crankcase may house the crankshaft of engine 104. In some examples, the vehicle system in which the engine system 1900 is installed may be a marine vehicle, and thus in some examples the crankshaft 1904 may be configured to selectively couple to a propeller.

The crankshaft 1904 includes a plurality of crank-webs, one of which, crank-web 1906, is shown in FIG. 19. The crank-webs are arranged into pairs, one pair of crank-webs defining a throw of the crankshaft, and each piston of the engine being coupled to a respective throw. Each crank-web pair includes a reference 1907 that is detectable by proximity sensors mounted to the crankcase wall. For example, the reference 1907 may be comprised of a particular material that the proximity sensors are configured to detect, e.g., metal, plastic, magnet, or other material. A plurality of proximity sensors are mounted to the crankcase wall. FIG. 19 shows four proximity sensors, sensor 1908a, sensor 1908b, sensor 1908c, and sensor 1908d, configured to measure the deflection for one crankshaft throw/cylinder. The engine system 1900 may include four proximity sensors for each crankshaft throw/cylinder. Sensor 1908d is positioned to measure the distance between the reference and the crankcase wall when the piston of the throw is positioned at BDC. Sensor 1908b is positioned to measure the distance between the reference and the crankcase wall when the piston of the throw is positioned at TDC. Sensor 1908c is positioned to measure the distance between the reference and the crankcase wall when the piston of the throw is positioned at halfway between TDC and BDC, in the downward motion direction (e.g., when the piston is traveling from TDC to BDC), also referred to as side 1. Sensor 1908a is positioned to measure the distance between the reference and the crankcase wall when the piston of the throw is positioned at halfway between BDC and TDC, in the upward motion direction (e.g., when the piston is traveling from BDC to TDC), also referred to as side 2. It is to be understood that the sensor positioning is schematic, and other positions are possible. For example, because the crankcase forms an oil sump that collects oil at the bottom of the crankcase, sensor 1908b may be suspended above the oil sump or otherwise protected from immersion in the oil.

Thus, as the engine is rotated each piston is moved from BDC to TDC and back to BDC, each proximity sensor may detect the displacement between the sensor and the reference as it passes by the sensor. This displacement data may be compared to known or expected displacement data to determine if the level of crankshaft deflection exceeds a threshold. If the level of deflection exceeds the threshold, the bearings or other components of the crankshaft may be inspected for wear and/or subject to maintenance to reduce the level of deflection.

By using sensors, manpower and time to record the crank web deflection will be reduced, for example to ten minutes for the whole engine readings to be recorded as opposed to 15 minutes for each cylinder. Further, opening of the crankcase doors can be avoided, and the crank door seals may be replaced less frequently since the door will be opened less. Additionally, more accurate measurements may be obtained, since human intervention is not required for actual measurement, and data can be sent directly sent to engine manufacturer via log reports for prognostics. Further still, less engine down time is needed to measure the deflection, which may translate into more propelling time, and the chance of engine damage due to foreign object falling into the sump during crank web deflection measurement is reduced.

An embodiment for a method for a turbocharger is provided. The method includes determining a level of turbocharger imbalance based on output from a turbine speed sensor; and generating a signal related to a change in a performance level of the turbocharger if the level of turbocharger imbalance is greater than a threshold. In an example, from the turbine speed sensor comprises a variable reluctance sensor (VRS) positioned proximate a toothed wheel of the turbocharger. In an example, determining the level of turbocharger imbalance comprises determining a clearance between a tip of the VRS and a top surface of one or more teeth of the toothed wheel. In an example, determining the clearance comprises: transforming a voltage signal output from the VRS into a frequency domain signal; extracting one or more of a first sideband or a second sideband of a carrier frequency of the frequency domain signal; and if one or both of a magnitude of the first sideband or a magnitude of the second sideband exceeds a respective threshold magnitude, indicating that the level of turbocharger imbalance is greater than the threshold. In an example, the toothed wheel comprises "N" teeth, and the carrier frequency comprises an "N frequency" of the frequency domain signal, wherein the first sideband comprises an "N−1 frequency" of the frequency domain signal, and the second sideband comprises an "N+1 frequency" of the frequency domain signal.

In an example, the toothed wheel comprises plural teeth, and the carrier frequency comprises a first component of the frequency domain signal, the first component corresponding to a total number of the plural teeth. The first sideband comprises a second component of the frequency domain signal, the second component corresponding to the total number less one, and the second sideband comprises a third component of the frequency domain signal, the third component corresponding to the total number plus one.

In an example, determining the clearance comprises: extracting an envelope of a voltage signal output from the VRS to generate a clearance signal; transforming the clearance signal into a frequency domain signal; and if a magnitude of a once per revolution frequency component of the frequency domain signal is greater than a threshold magnitude, indicating that the level of turbocharger imbalance is greater than the threshold. In an example, determining the clearance comprises: extracting an envelope of a voltage signal output from the VRS to generate a clearance signal; and if a peak-to-peak magnitude of the clearance signal exceeds a threshold magnitude, indicating that the level of turbocharger imbalance is greater than the threshold. In an example, the method further comprises ceasing engine operation in response to the generating of the signal related to the change in the performance level of the turbocharger. In an example, the method further comprises derating engine power in response to the generating of the signal related to the change in the performance level of the turbocharger. In an example, the method further comprises determining turbine speed of a turbine of the turbocharger based on a frequency of voltage output of the turbine speed sensor.

An embodiment for a turbocharger system includes a turbine coupled to a compressor via a shaft; a turbine speed sensor; and a controller. The controller is configured to: determine a level of turbocharger imbalance based on a voltage signal output from the turbine speed sensor; and if the level of turbocharger imbalance is greater than a threshold, generate a signal related to a change in an operating condition of the turbocharger. In an example, the turbine speed sensor is a variable reluctance sensor (VRS). In an example, the controller is configured to determine the level of turbocharger imbalance based on one or more of a time domain or a frequency domain of the voltage signal. In an example, to determine the level of turbocharger imbalance based on the frequency domain of the voltage signal, the controller is configured to: transform the voltage signal output from the VRS into a frequency domain signal; extract one or more of a first sideband or second sideband of a carrier frequency of the frequency domain signal; and if one or both of a magnitude of the first sideband or a magnitude of the second sideband exceeds a respective threshold magnitude, indicate that the level of turbocharger imbalance is greater than the threshold. In an example, to determine the level of turbocharger imbalance based on the frequency domain of the voltage signal, the controller is configured to: extract an envelope of the voltage signal output from the VRS to generate a clearance signal; transform the clearance signal into a frequency domain signal; if a magnitude of a once per revolution frequency component of the frequency domain signal is greater than a threshold magnitude, indicate that the level of turbocharger imbalance is greater than the threshold. In an example, to determine the level of turbocharger imbalance based on the time domain of the voltage signal, the controller is configured to: extract an envelope of a voltage signal output from the VRS to generate a clearance signal; and if a peak-to-peak magnitude of the clearance signal exceeds a threshold magnitude, indicate that the level of turbocharger imbalance is greater than the threshold. In an example, the controller comprises an analog circuit configured to demodulate the voltage signal output from the turbine speed sensor, the analog circuit comprising one or more of a step-down stage, a peak detector stage, a low pass filter, a high pass filter, or level shifter stage.

An embodiment relates to a turbocharger system. The turbocharger system includes a turbine coupled to a compressor via a shaft; a variable reluctance sensor (VRS) positioned proximate a toothed wheel coupled to the shaft; and a controller. The controller is configured to: extract an envelope of a voltage signal output from the VRS to generate a clearance signal; transform the clearance signal into a frequency domain signal; and if a magnitude of a once per revolution frequency component of the frequency domain signal is greater than a threshold magnitude, indicate turbocharger imbalance. In an example, the controller is further configured to at least one of cease engine operation or derate engine power responsive to the indication of turbocharger imbalance. In an example, the controller is further configured to determine a turbine speed of the turbine of the turbocharger based on a frequency of the voltage signal output from the VRS.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   with a controller configured to receive an output signal from a turbine speed sensor of a turbocharger of an engine system, determining a level of turbocharger imbalance of the turbocharger based on the output signal from the turbine speed sensor;
   with the controller, generating a signal indicative of a change in a performance level of the turbocharger responsive to the level of turbocharger imbalance being greater than a threshold;
   and with the controller, controlling the engine system or a component in a vehicle system that includes the engine system in response to the generating of the signal.

2. The method of claim 1, wherein the turbine speed sensor comprises a variable reluctance sensor (VRS) positioned adjacent to a toothed wheel of the turbocharger.

3. The method of claim 2, wherein determining the level of turbocharger imbalance comprises determining a clearance between a tip of the VRS and a top surface of one or more teeth of the toothed wheel.

4. The method of claim 3, wherein determining the clearance comprises:
transforming a voltage signal output from the VRS into a frequency domain signal;
extracting one or more sidebands of a carrier frequency of the frequency domain signal; and
responsive to one or more magnitudes of the one or more sidebands exceeding a respective threshold magnitude, indicating that the level of turbocharger imbalance is greater than the threshold.

5. The method of claim 4, wherein the toothed wheel comprises "N" teeth, and the carrier frequency comprises an "N frequency" of the frequency domain signal, wherein the one or more sidebands include a first sideband and a second sideband, wherein the first sideband comprises an "N−1 frequency" of the frequency domain signal, and the second sideband comprises an "N+1 frequency" of the frequency domain signal.

6. The method of claim 3, wherein determining the clearance comprises:
generating a clearance signal, the clearance signal comprising an extracted envelope of a voltage signal output from the VRS;
transforming the clearance signal into a frequency domain signal; and
responsive to a magnitude of a once per revolution frequency component of the frequency domain signal being greater than a threshold magnitude, indicating that the level of turbocharger imbalance is greater than the threshold.

7. The method of claim 3, wherein determining the clearance comprises:
generating a clearance signal, the clearance signal comprising an extracted envelope of a voltage signal output from the VRS; and
responsive to a peak-to-peak magnitude of the clearance signal exceeding a threshold magnitude, indicating that the level of turbocharger imbalance is greater than the threshold.

8. The method of claim 1, wherein controlling the engine system or a component of a vehicle including the engine system comprises ceasing engine operation in response to the generating of the signal related to the change m the performance level of the turbocharger.

9. The method of claim 1, wherein controlling the engine system or a component of a vehicle including the engine system comprises derating engine power in response to the generating of the signal related to the change in the performance level of the turbocharger.

10. The method of claim 1, further comprising determining turbine speed of a turbine of the turbocharger based on a voltage frequency of the output signal of the turbine speed sensor.

11. A system, comprising:
an engine;
a turbocharger comprising a turbine coupled to a compressor via a shaft;
a turbine speed sensor; and
a controller configured to:
determine a level of turbocharger imbalance based on a voltage signal output from the turbine speed sensor; and
responsive to the level of turbocharger imbalance being greater than a threshold, generate a signal indicative of a change in an operating condition of the turbocharger, the controller configured to control the engine or a component in a vehicle system that includes the engine in response to the generating of the signal.

12. The system of claim 11, wherein the turbine speed sensor is a variable reluctance sensor.

13. The system of claim 11, wherein the controller is configured to determine the level of turbocharger imbalance based on one or both of a time domain or a frequency domain of the voltage signal.

14. The system of claim 13, wherein to determine the level of turbocharger imbalance based on the frequency domain of the voltage signal, the controller is configured to:
transform the voltage signal output from the turbine speed sensor into a frequency domain signal;
extract one or more sidebands of a carrier frequency of the frequency domain signal; and
responsive to one or more magnitudes of the one or more sidebands exceeding a respective threshold magnitude, indicate that the level of turbocharger imbalance is greater than the threshold.

15. The system of claim 13, wherein to determine the level of turbocharger imbalance based on the frequency domain of the voltage signal, the controller is configured to:
generate a clearance signal, the clearance signal comprising an extracted envelope of the voltage signal output from the turbine speed sensor;
transform the clearance signal into a frequency domain signal; and
responsive to a magnitude of a once per revolution frequency component of the frequency domain signal being greater than a threshold magnitude, indicate that the level of turbocharger imbalance is greater than the threshold.

16. The system of claim 13, wherein to determine the level of turbocharger imbalance based on the time domain of the voltage signal, the controller is configured to:
generate a clearance signal, the clearance signal comprising an extracted envelope of a voltage signal output from the turbine speed sensor; and
responsive to a peak-to-peak magnitude of the clearance signal exceeding a threshold magnitude, indicate that the level of turbocharger imbalance is greater than the threshold.

17. The system of claim 11, wherein the controller comprises an analog circuit configured to demodulate the voltage signal output from the turbine speed sensor, the analog circuit comprising a step-down stage, a peak detector stage, a low pass filter, a high pass filter, and/or a level shifter stage.

18. A system, comprising:
an engine;
a turbocharger comprising a turbine coupled to a compressor via a shaft;
a variable reluctance sensor (VRS) positioned adjacent to a toothed wheel coupled to the shaft; and
a controller configured to:
generate a clearance signal, the clearance signal comprising an extracted envelope of a voltage signal output from the VRS;
transform the clearance signal into a frequency domain signal;

responsive to a magnitude of a once per revolution frequency component of the frequency domain signal being greater than a threshold magnitude, generate a signal indicative of turbocharger imbalance of the turbocharger; and responsive to the generating of the signal, control the engine or a component in a vehicle system that includes the engine.

19. The system of claim 18, wherein controlling the engine or the component comprises ceasing engine operation of the engine and/or derating engine power of the engine.

20. The system of claim 18, wherein the controller is further configured to determine a turbine speed of the turbine of the turbocharger based on a frequency of the voltage signal output from the VRS.

* * * * *